Jan. 3, 1928.
J. G. JACKSON
1,655,188
CONSTRUCTION OF REENFORCED BAKING PANS
Filed April 8, 1927
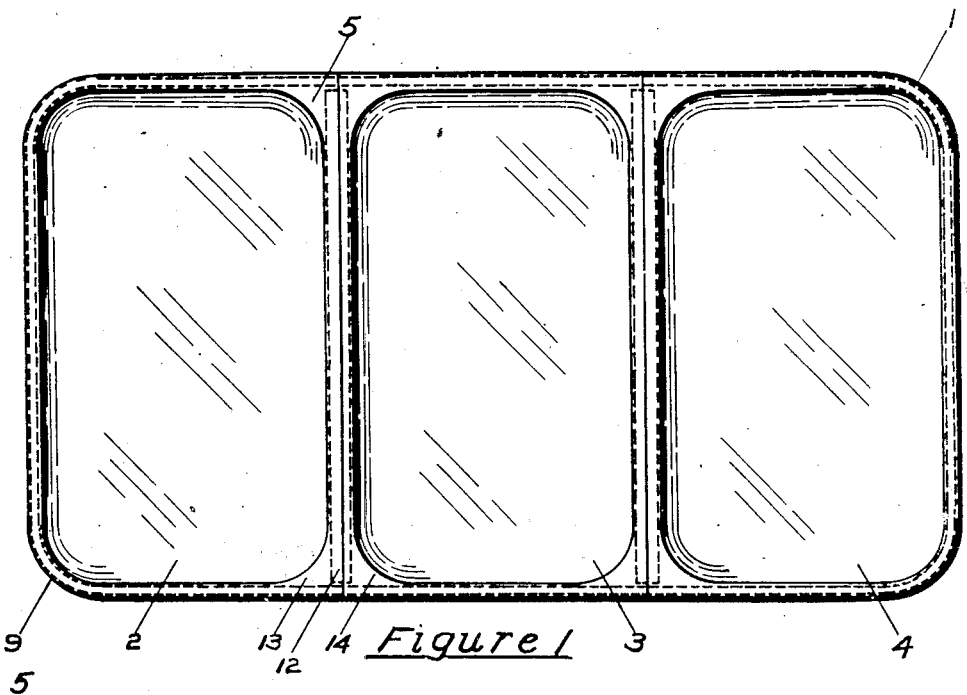
Figure 1
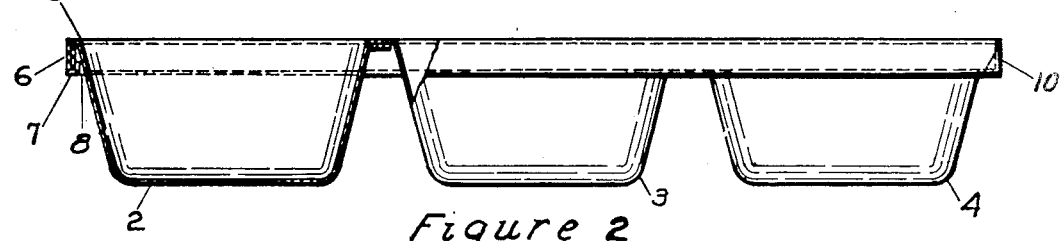
Figure 2
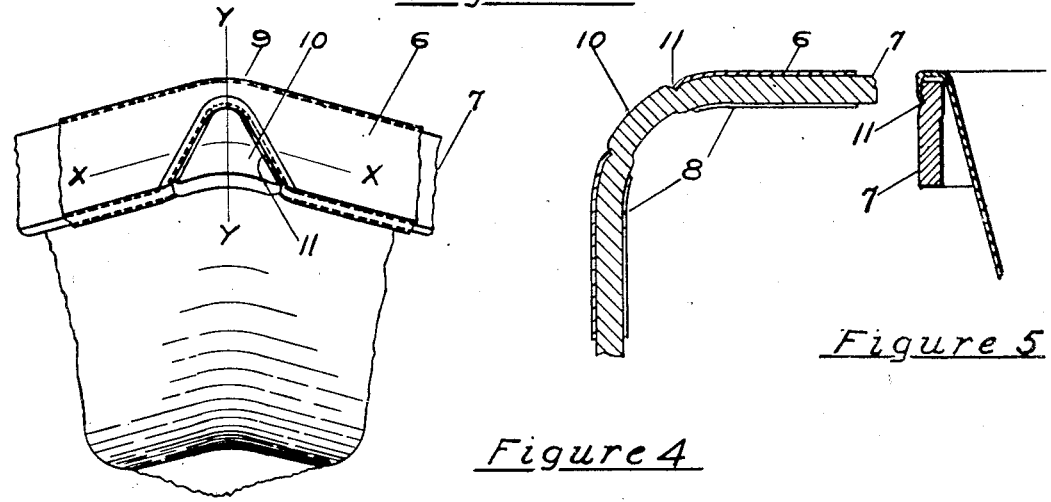
Figure 3
Figure 4
Figure 5
Joseph George Jackson
Inventor
Attorney Patented Jan. 3, 1928.

1,655,188

UNITED STATES PATENT OFFICE.

JOSEPH GEORGE JACKSON, OF CHICAGO, ILLINOIS, ASSIGNOR TO EDWARD KATZINGER COMPANY, OF CHICAGO, ILLINOIS.

CONSTRUCTION OF REENFORCED BAKING PANS.

Application filed April 8, 1927. Serial No. 182,067.

This invention relates to pans used for baking bread, cake and similar articles and is employed ordinarily by wholesale bakeries, although obviously the same construction may be used for domestic cooking purposes, or for other applications some of which are mentioned herein.

The object of this invention is to provide a strong, light, durable and simple baking pan free from sharp edges or projections. Further objects of this invention are to provide a set of pans which will give a maximum life, provide maximum ease of cleaning and have other obvious advantages which will be set forth in the specification, claims and drawing.

Referring to the drawing:

Figure I shows a plan view of a set of three pans attached together in a unit and embodying the features of my invention;

Figure II shows a side elevation partly in section of the set of three pans;

Figure III shows in perspective a corner of one of the end pans, showing in more detail some features of my invention;

Figure IV shows a section through a portion of the corner of the pan illustrated in Figure III, Figure IV is taken on section line X—X;

Figure V shows a section taken on line Y—Y of Figure III.

This invention refers particularly to baking pans which are drawn in a seamless manner without fold or joint and from a single sheet of tin plate.

Referring to the drawing;

(1) represents a set of pans composed of individual units (2, 3 and 4). Each of the individual pans is formed with a horizontal top deck portion, indicated as (5). The edges of the deck portion (5) are bent downward as indicated at (6) around the reenforcing strap member (7) which serves to unite the pans into a single set. Edge (6) is folded around the lower portion of strap member (7) and upward as indicated at (8).

Strap member (7) may be made from a rectangular bar or made of any other desired consistent cross-section. At the corners of the set of pans indicated for purposes of illustration by (9), the strap member (7) is bent around a radius, preferably of relatively large dimension to give a smooth gradual bend. A triangular portion of the strap (7) indicated by (10) is exposed at each corner. This is shown clearly in Figure III and represents the division between the adjacent side and end of the set. In previous pans, it has been customary to leave the sharp edge of the tin plate exposed at this point. This previous practice offers some difficulties in that the sharp edge forms a projection on which the bakers or those handling the pans are likely to catch or tear their hand. Such a joint, also presents a crevice in which dough, grease or impurities may collect or decay. One of the features of the set of pans which I have invented, is the freedom from crevices of the kind described and the elimination of opportunity for bakers or those using the pans to tear their hand.

I have avoided the condition incidental to the sharp edges at the corner of the pans by the construction shown and described in this specification. I provide a groove or indentation (11) running along the edge of the sheet metal which is exposed at the corner portion (10) of the set of pans. The edge of the tin plate is then turned downward and inward into the groove (11) thus entirely concealing the sharp edge. The metal of the strap is then raised outward and downward as shown at (10) forming a surface which may be in any desired plane, but which I prefer to arrange so that it will lie in substantially the same plane as the outer surface of the tin plate (6) which is bent around strap (7).

This construction gives a superior set of pans and provides many advantages as set forth.

For purposes of further reenforcing the set I provide means as indicated by strip (12) underneath adjacent edges (13 and 14) of adjacent pans. Strip (12) may be spot welded or seamed to edges (13 and 14) forming a strong and rigid joint and uniting the group of pans into a single set.

It will be apparent from considering the drawings, and specifications that I do not wish to be restricted to the exact description given or shown, but wish my invention be interpreted in the spirit of the disclosure and the present state of the art. Obvious modifications may be made in the details without departing from the spirit of this invention.

Having now fully described my invention, what I claim as new and wish to secure by Letters Patent in the United States, is as follows:

1. A series of reenforced baking pans united into a set by a strapping member, said strapping member surrounding the upper edges of said set and provided with depressions near the corners, the edges of the pans of said set in contact with said strapping member being formed over said strapping member, and so arranged that the adjacent edges of said pans which are formed over said strapping member are bent into said depressions.

2. In a set of reenforced baking pans a strapping member having transverse depressions adjacent to the corners of said set, the edges of a portion of the sides of the pan in contact with said strapping member being bent to engage with said transverse depressions.

3. A set of baking pans, united together by a strapping member having transverse depressions adjacent the corners of said sets, the sides of said pans being extended about said strapping member, said depressions serving to receive the rolled-over raw edges of the sides of said pans in contact with said strapping member.

4. In a set of baking pans a strapping member serving to unite the individual pans together, and having transverse depressions near the corners of said set.

5. A strapping member serving to unite a series of pans into a set, the outer face of said strapping member having depressions adjacent the corners of said set, the portion of said strapping member surrounded by said depressions being raised above the normal level of the surrounding adjacent surface of said strapping member.

JOSEPH GEORGE JACKSON.